United States Patent [19]

Fukumoto et al.

[11] Patent Number: 5,012,847
[45] Date of Patent: May 7, 1991

[54] PNEUMATIC TIRE HAVING TREAD PATTERN WITH REDUCED STONE BITING

[75] Inventors: Testuhiro Fukumoto; Atsushi Yamahira, both of Kobe, Japan

[73] Assignee: Sumitomo Rubber Industries, Ltd., Hyogo, Japan

[21] Appl. No.: 385,145

[22] Filed: Jul. 26, 1989

[30] Foreign Application Priority Data

Jul. 29, 1988 [JP] Japan .................. 63-191881

[51] Int. Cl.$^5$ .......................................... B60C 11/06
[52] U.S. Cl. ..................... 152/209 R; 152/DIG. 1
[58] Field of Search ........... 152/209 R, 209 D, 209 A, 152/DIG. 1, DIG. 3, DIG. 4; D12/141–143, 147

[56] References Cited

U.S. PATENT DOCUMENTS

| | | | |
|---|---|---|---|
| D. 177,655 | 5/1956 | Wolfer | D12/143 |
| D. 208,844 | 10/1967 | Wittenmyer | D12/141 |
| 2,808,867 | 10/1957 | Buddenhagen et al. | 152/209 R |
| 3,674,076 | 7/1972 | Dailey, Jr. | 152/209 R |
| 3,847,698 | 11/1974 | Ravenhall | 152/209 R |
| 4,484,610 | 11/1984 | Wallet et al. | 152/209 R |
| 4,690,189 | 9/1987 | Bradisse et al. | 152/209 R |
| 4,807,679 | 2/1989 | Collette et al. | 152/209 R |

*Primary Examiner*—Michael W. Ball
*Assistant Examiner*—Geoffrey L. Knable
*Attorney, Agent, or Firm*—Birch, Stewart, Kolasch & Birch

[57] ABSTRACT

A pneumatic tire having a tread pattern in which one or more approximately straight longitudinal grooves extending to the circumferential direction of the tire are provided in the tread at a distance (h) from the tire equator to the center of said groove within the range of not more than ⅜ time the distance (H) between the tire equator and the tread edge, said longitudinal groove being composed of repeatedly formed portions each of which has a shape such that the groove width in the tire axial direction between the opposed groove walls varies along the circumferential direction of the tire, whereby the longitudinal grooves, especially those positioned at the center portion of the tread, are prevented from biting small stones without decreasing the wet grip performance of the tire.

5 Claims, 5 Drawing Sheets

PNEUMATIC TIRE HAVING TREAD PATTERN WITH REDUCED STONE BITING

BACKGROUND OF THE INVENTION

The present invention relates to a pneumatic tire having a tread pattern designed so as to reduce stone biting without reducing the wet grip performance.

A pneumatic tire used for heavy duty vehicles, passenger cars and the like, are generally provided with straight or zig-zag longitudinal grooves extending in the circumferenial direction of the tire on the tread part from the view point of tire performances such as drainage, wear resistance and steering stability. It is unavoidable to run tires on rough roads in addition to paved roads. For instance, vehicles may be driven into a parking place in which broken stones are scattered thereon. In such a case, these longitudinal grooves are apt to bite pebbles or small broken stones. In addition, since the longitudinal grooves are generally formed in a constant groove width, the force of biting the stones is also strong. Accordingly, when the grooves once bite small stones, they are hard to be released and this stones causes cracking or damage of the bottom of the grooves and damage or breakage of the belt and the rubber inside the tire.

As a countermeasure against stone-biting and in order to prevent the stone-biting or to facilitate the release of small stones bitten by the grooves, it has heretofore been attempted to make the width of the longitudinal grooves wider or to arrange protrusions on the groove bottom of the grooves. However, the former method has the disadvantage that the wear resistance is decreased, and the latter method has the disadvantage that the drainage is decreased with the progress of the wear of the tread, so that the wet grip performance is decreased.

It is, therefore, an object of the present invention to advantageously solve the problem of stone-biting without causing a deterioration in the wet grip performance of tires.

A further object of the present invention is to provide a pneumatic tire having a tread pattern designed so as to prevent the grooves from biting small stones without lowering the wet grip pereformance of the tire.

These and other objects of this invention will become apparent from the description given hereinafter.

SUMMARY OF THE INVENTION

It has been found that the above-mentioned objects can be achieved by forming a longitudinal groove or grooves of a particular shape, in which the width repeatedly varies, particularly in the center portion of the tread where the stone-biting is apt to occur.

In accordance with the present invention, there is provided a pneumatic tire having a tread pattern in which one or more approximately straight longitudinal grooves extending in the circumferential direction are formed in the surface of the tire tread so that the center line of said groove is located in a zone extending from the tire equatorial plane a distance from said equatorial plane not edxceeding ⅔ of the distance (H) from the tire equatorial plane to the tread edge, each of said longitudinal grooves being composed of repeatedly formed changing parts in which the groove width in the axial direction between the opposed groove walls of each changing part varies along the circumferential direction of the tire.

In a preferable embodiment of the present invention, the changing part (repeating unit or part) is formed into a shape such that the width-enlarging parts are arranged on both sides of a narrow width part. The groove wall at the narrow width part may be provided with one or more sipes or small concave parts. Also, from the viewpoint of running stability, it is desirable to make either one of the opposed groove walls at the width-enlarging part of the changing part straight and in parallel to the tire equatorial plane.

The present invention utilizes the fact that by the repeated deformation due to compression and restoration of the tread rubber which occur at grounding and non-grounding and by the centrifugal force for every rotation of the tire, small stones bitten by the grooves shift toward the trailing side (kicking-out side). In the pneumatic tire constructed as mentioned above according to the present invention, small stones bitten in the width-enlarging part which becomes wide in groove width toward the trailing side are easily released. Small stones bitten in the width-enlarging part which becomes narrow in groove width toward the trailing side, passes through the narrow width part and are easily released from the width-enlarging part where the groove width increses toward the trailing side. Thus, tire damage caused by stones bitten by the grooves can be prevented.

Such longitudinal grooves are disposesd at the tread center region where the grooves bite small stones more frequently, that is, in the area extending from the center of the tread at a distance (h) of not more than ⅔ of the distance (H) between the tire equatorial plane to the tread edge, whereby the effect on decreasing the damage of tire caused by small stones bitten by the grooves is effectively achieved.

Furthermore, the movement of the stones in the narrow width part toward the width enlarging part can be ensured by forming a sipe or small concave part in either or both groove walls of the narrow width part to decrease the rubber rigidity. One or more sipes may also be formed in the groove walls of the width enlarging parts.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

The present invention will now be described in detail with reference to the accompanying drawings.

Figure 1:
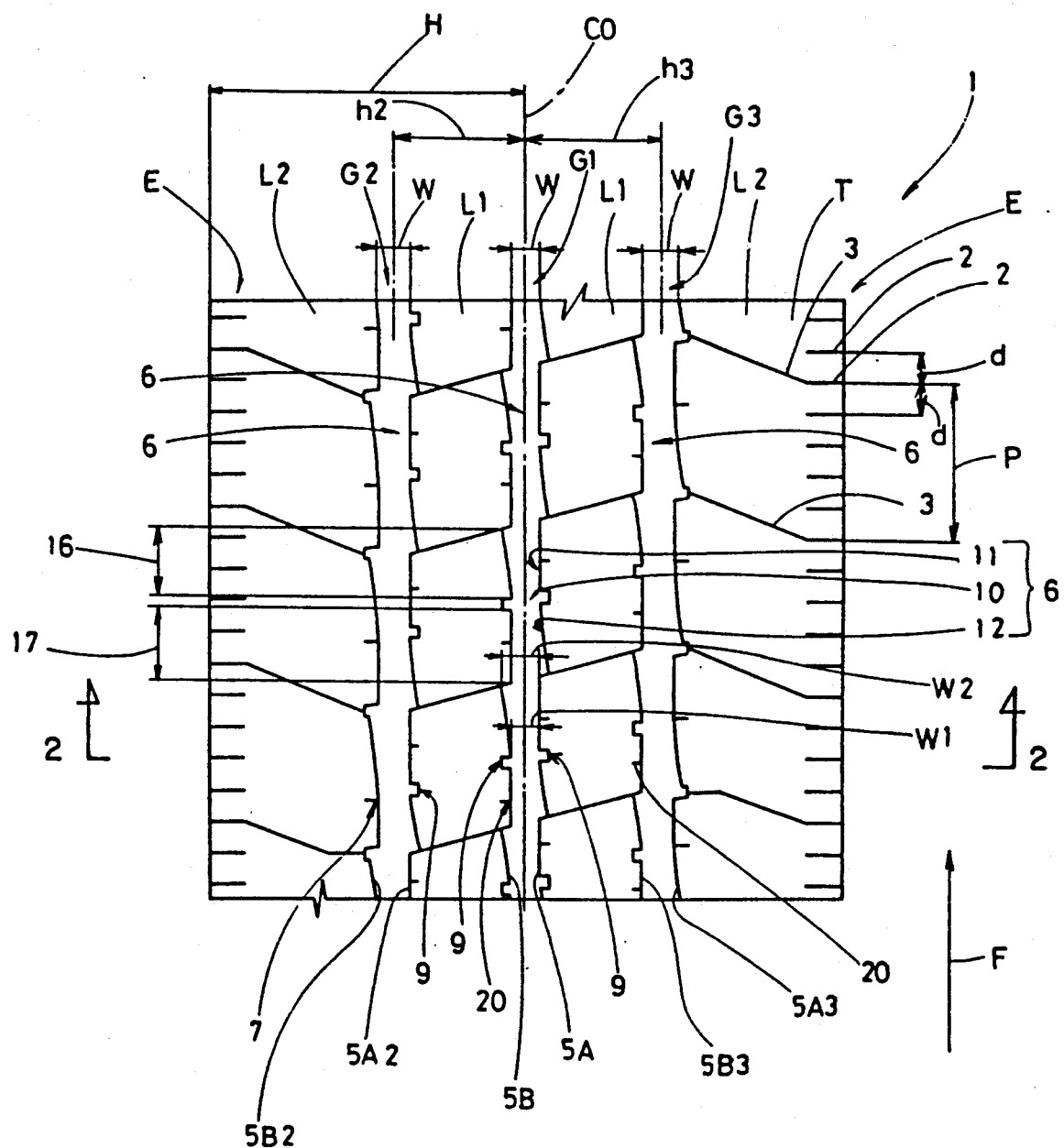
FIG. 1 is a partial plan view of the tread of a tire showing an embodiment of the present invention.
Figure 2:
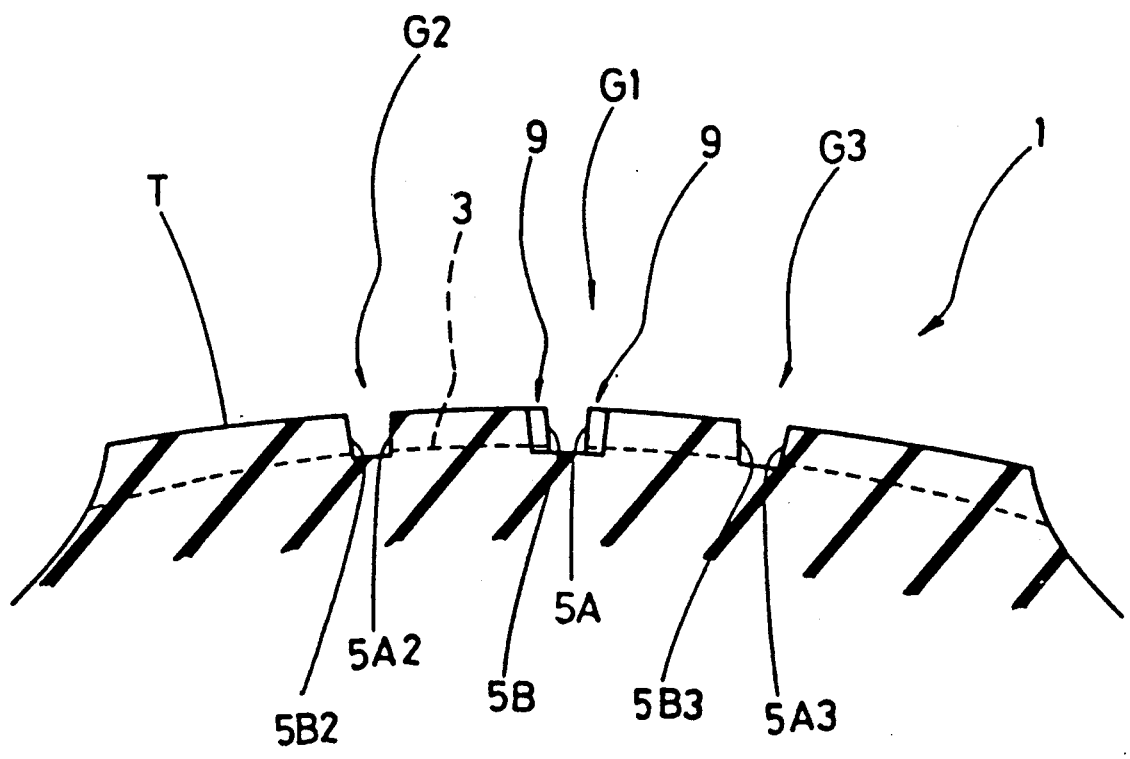
FIG. 2 is a section view taken along a line A—A of FIG. 1.

FIG. 1 is a partial plan view of an embodiment of the tread of the pneumatic tire according to the present invention, and FIG. 2 is a sectional view taken along the line 2—2 of FIG. 1.

In the drawings, tire 1 is provided in its tread portion T with a rib type tread pattern wherein three approximately straight longitudinal grooves G1, G2 and G3 are arranged and extends in the circumferential direction of the tire. The central longitudinal groove G1 is arranged so that the groove center is positioned at the equator CO of the tire. The longitudinal grooves G2 and G3 are arranged in the surface of tread T so that each distance h2 and h3 from each groove center to the tire equator CO falls within the range of not more than ⅔ time the distance H from the tire equator CO to each of the tread edges E. Longitudinal grooves G1, G2 and G3 each has a uniform groove bottom having a constant depth. In this embodiment, each distance h2 and h3 are made equal.

In each of the tread edge portions, narrow shoulder grooves 2 extending in the axial direction of the tire are placed at small intervals d in the circumferential direction, whereby heat radiation effect is increased to prolong the tire life and the rigidity of the tread edge portion is lowered to decrease such uneven wear as shoulder wear and the like.

In center ribs L1 and shoulder ribs L2 defined by the longitudinal grooves G1–G3, a number of lateral grooves 3 with a narrow width are formed in parallel to or at a small angle with respect to the tire axial direction at a suitable pitch P of integral number times the above-mentioned interval d in order to raise the drainage to thereby raise the wet grip performance. In order to reduce noise by dispersing a noise pattern caused by air-pumping noise and impacting noise of the lateral grooves 3 into a wide frequency range, it is desirable to form the lateral grooves 3 at varied pitches.

Each of the longitudinal grooves G1–G3 are formed by repeatedly arranging the changing parts 6, in which the groove width W in the tire axial direction between the groove walls 5A and 5B varies along the circumferential direction of the tire, at the above-mentioned pitch P.

Figure 3:
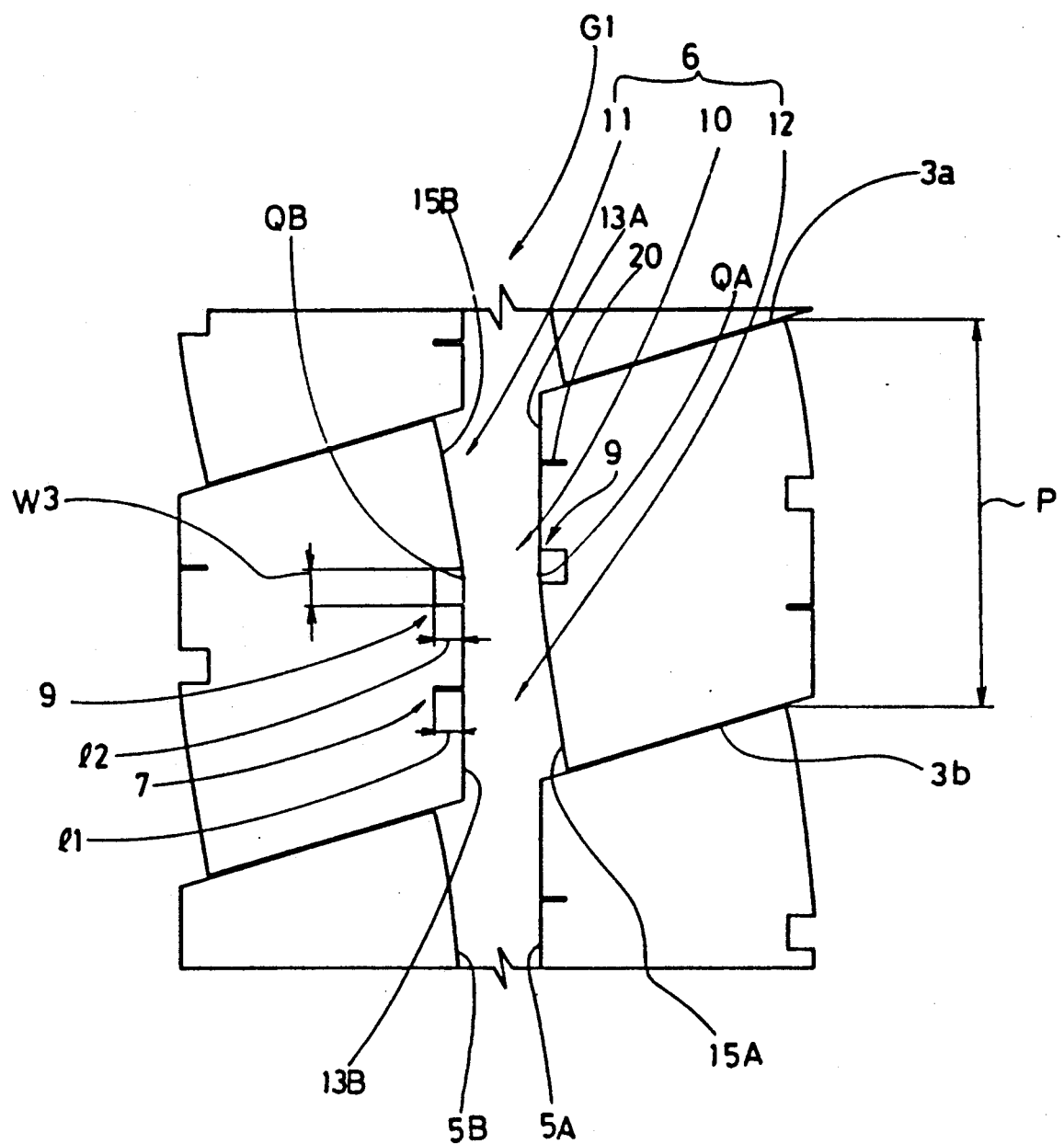
FIG. 3 is a partially enlarged view illustrating the changing part (repeating part) of the longitudinal groove formed in the thread.

In the changing part 6 of this embodiment, as shown in FIG. 3, a groove wall 5A is comprised of a straight part 13A extending in parallel with the tire equator from the intersecting point with the lateral groove 3a, and an inclined part 15A inclining from the end of the straight part 13A toward lateral groove 3b adjacent to the lateral groove 3a so that the groove width increases. The other groove wall 5B is comprised of an inclined part 15B constructed in the same manner as the inclined part 15A and a straight part 13B constructed in the same manner as the straight part 13A, which are arranged so as to face the straight part 13A and the inclined part 15A, respectively.

Accordingly, in the changing part 6, narrow width part 10 is formed between crossing points180 parts 13A and 13B intersect with the inclined part 15A and 15B, respectively. On both sides of the narrow width part 10, a width enlarging part 11 held between the straight part 13A and the inclined part 15B and a width enlarging part 12 held between the straight part 13B and the inclined part 15A are formed, respectively. Each length 16, 17 of the width enlarging parts 11 and 12 is preferably set from ⅓ to ½ of the pitch P.

The amount of change of the groove width W in the changing part 6 is preferably such that the ratio W2/W1 of the maximum groove width W2 of the width enlarging part 11, 12 at its end to the minimum groove width W1 of the narrow width part 10 is from 0.015 to 0.035 times the pitch P. If the ratio W2/W1 is less than 0.015P, the changing amount of the groove width is insufficient for facilitating the release of bitten stones, and if it is more than 0.035P, the changing amount of the groove width is too large. Thus stones bitten by the width enlarging part which becomes narrow in width toward the kick-out side, e.g. width enlarging part 12, are securely held therein, so that it is difficult for stones to move through the narrow width part 10.

In either or both of the groove walls 5A and 5B of the narrow width part 10, one or more sipes 7 or small concave parts 9 are formed in order to decrease the rigidly of the narrow width part 10 and to soften the movement of the rubber, by which the stones, bitten by the width enlarging portion which narrows toward the kick-out side F, e.g. width enlarging portion 12, are facilitated and ensured to pass through the narrow width part 10.

In this embodiment, small concave parts 9 are formed in both groove walls 5A, 5B located at each of the narrow width parts 10 of the longitudinal groove G1, and in one wall located at each of the narrow width parts 10 of the longitudinal grooves G2 and G3, namely in groove walls 5A2, 5B3 located on the tire equator side of the narrow width parts 10. Also, sipes 7 are formed in the other outer groove walls of the grooves G2 and G3 at the position of the narrow width parts 10.

Each of the lengths 11 and 12 in the tire axial direction of the sipe 7 and small concave part 9 is preferably at most 0.2 times the pitch P, and the width W3 in the longitudinal direction of the small concave part 9 is preferably at most 0.4 times the pitch P. When the length 11 or 12 is more than 0.2P, uneven wear caused by the sipe or the small concave part 9 is apt to be produced, and when the width W3 of the small concave part is more than 0.4P, the small concave part 9 restrains stones therein to prevent the stones from passing through the narrow width part 10.

In this embodiment, the straight parts 13A and 13B are also provided with sipes 20 identical or similar to the sipes 7 to decrease the rigidity of groove walls 5A and 5B, thereby facilitating the movement of small stones bitten by the groove toward the kicking-out side thereof.

As mentioned above, the longitudinal groove G is formed by repetition of the changing parts 6 provided with the narrow width part 10 and the width-enlarging parts 11 and 12 whose groove width is widen in the circumferential direction and which are arranged at the both sides of the narrow width part 10. Consequently, when a small stone is bitten, for example, by the width enlarging part 11 whose groove width increases in the kick-out direction F, the stone can easily release from the width enlarging part 11 by repeated deformation of the tread rubber resulting from the compression and restoration of the tread and by the centrifugal force resulting from the rotation of the tire. If a small stone is bitten, for example, by the width enlarging part 12 which groove width decreases in the kicking direction F, the stone moves to the kick-out side by the repeated tread deformation and centrifugal force, and the stone which has passed through the narrow width part 10 to the adjacent width enlarging part 11, is easily released therefrom. The sipe 7 and the small concave part 9 provided in the width narrowing part 10 facilitate and ensure the passing of stones through the narrow width part. Also, the stability during straight running is raised by providing the straight part 13A, 13B in the changing part 6.

Figure 4:
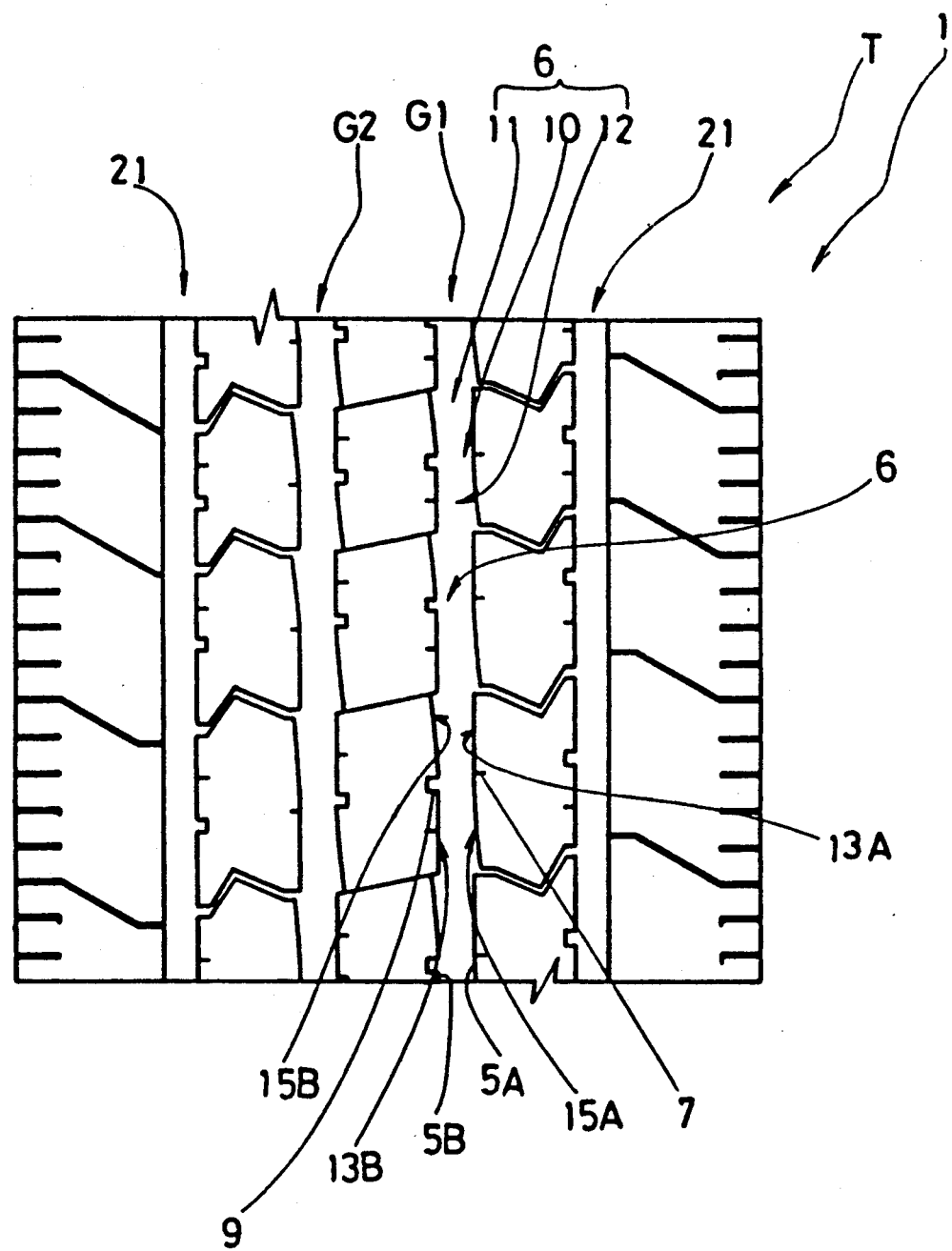
FIG. 4 is a partial plan view of the tread showing another embodiment of the present invention.

Another embodiment of the present invention is shown in FIG. 4. In the drawing, tire 1 has, in its tread part T, two longitudinal grooves G1 and G2 each composed of repeatedly formed changing parts 6. On the outer sides of both of groove G1 and G2, straight longitudinal grooves 21, 21 having a constant width are arranged. In the narrow width part 10 of the changing part 6, a sipe 7 is formed in the wall 5A and a small concave part 9 is formed in the other groove wall 5B.

EXAMPLE

A tire having the tread pattern shown in FIG. 4 was produced and attached to a car. The car was run at 20 km/hour for 30 m on a graveled parking area. The number of small stones bitten by the grooves within the area of a quarter of the tire circumference was counted. This procedure was repeated many times. The average valve of the number of bitten stones is shown in FIG. 5.

A reference tire having a tread pattern substantially the same as shown in FIG. 4 except that the longitudinal grooves G1 and G2 were formed into straight grooves having a constant groove width the same as the groove 21 was produced for comparison, and the same running test as above was made. The result is also shown in FIG. 5.

Figure 5:
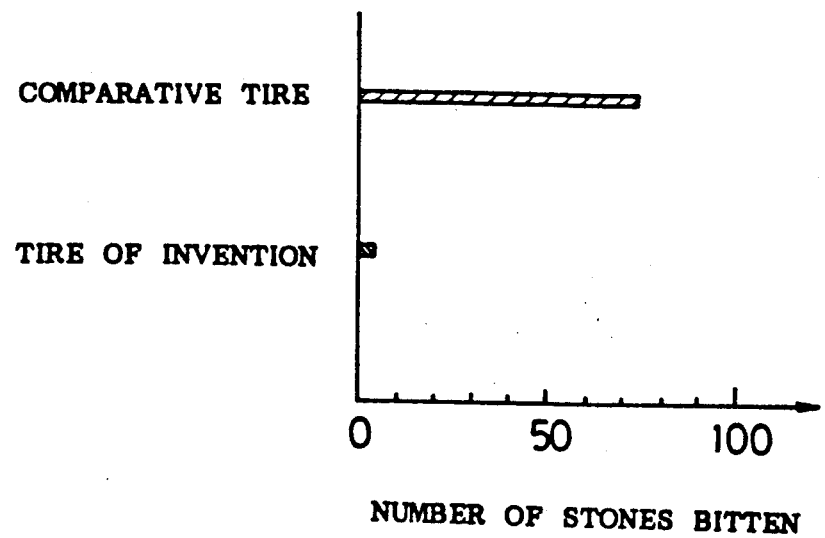
FIG. 5 is a graph showing the number of stones bitten by grooves of a tire according to the present invention and of a comparative tire.

From FIG. 5, it would be apparent that the number of stones bitten by the longitudinal grooves is remarkably decreased by the tread pattern according to the present invention as compared with the comparative example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pneumatic tire having a tread provided with a central longitudinal groove and lateral longitudinal groove, said longitudinal grooves extending substantially straight in the circumferential direction of the tire to define two center circumferential ribs between said central longitudinal groove and said lateral longitudinal grooves, the longitudinal grooves being positioned so that the distance (h) from the groove center of the lateral longitudinal grooves to the tire equator is not more than ⅔ times the distance (H) from the tire equator to the edge of the tread, a plurality of lateral grooves arranged at intervals in the circumferential direction of the tire and extending across the center circumferential ribs whereby said ribs are divided into a plurality of axially adjacent blocks which extend in the circumferential direction of the tire, said axially adjacent blocks defining therebetween said central longitudinal groove with a repeating pattern as it extends in the circumferential direction of the tire, said pattern having a narrowed area which gradually increases in width on both sides thereof, and the interval between the adjacent lateral grooves is equal to the length, in the circumferential direction of the tire, of the repeating pattern of said longitudinal grooves, said increase in width of the central longitudinal groove on both sides of the narrowed area being defined by a straight wall portion extending parallel to the tire equator and an opposing inclined wall portion, said straight and inclined wall portions changing to the opposite walls of the longitudinal groove on opposite sides of the narrowed areas.

2. The pneumatic tire of claim 1, wherein said lateral longitudinal grooves and the edge of the tire tread define lateral shoulder ribs which are disposed adjacent said center ribs, said plurality of lateral grooves also extending across said shoulder ribs, said lateral grooves being disposed substantially parallel to or at a small angle relative to the axial direction of the tire.

3. The pneumatic tire of claim 2, wherein the lateral grooves in the center ribs are disposed at a different angle from those in the shoulder ribs.

4. The pneumatic tire as set forth in claim 2, wherein at least one sipe is formed in the longitudinal groove walls located on both sides of the narrowed area.

5. The pneumatic tire as set forth in claim 2, wherein the length in the tire circumferential direction of at least one repeating pattern is different from the length in the tire circumferential direction of the other repeating patterns.

* * * * *